2,796,854

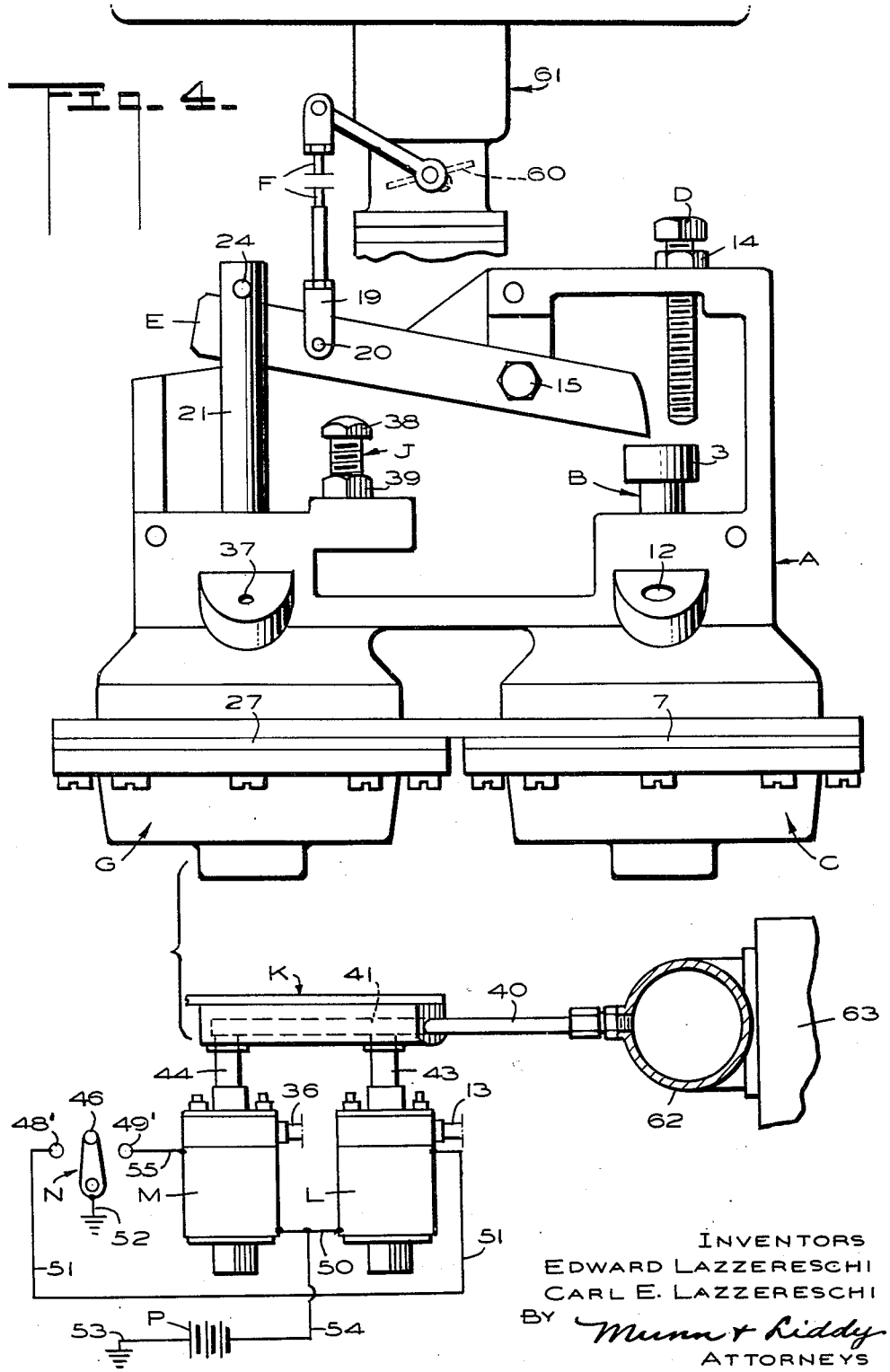

VARIABLE TWO SPEED ENGINE CONTROL

Edward Lazzereschi, Oakland, and Carl E. Lazzereschi, San Leandro, Calif.

Application November 22, 1955, Serial No. 548,372

3 Claims. (Cl. 123—102)

Our invention relates to improvements in a variable two speed engine control, and it consists in the combinations, constructions, and arrangements, hereinafter described and claimed.

Our device is designed primarily to be used on gasoline delivery trucks where the operator desires to drive pumps either at a low speed of about 500 R. P. M., or at a high speed of 1000 R. P. M. The truck engine is used for driving the pumps and a power take-off is controlled with a separate lever by the operator and may be connected to or disconnected from the transmission and thus the pumps are operated. When the power take-off is connected to the transmission, the truck engine is usually operating at an idling speed of about 350 R. P. M. The cargo tank valve is still closed and remains closed until the operator is ready to deliver gasoline to the inlet pipe of an underground gasoline tank in a service station or to the inlet of a gasoline tank in the wing of an airplane.

Our device is now actuated in a manner hereinafter to be described to cause the engine to operate at a low speed of about 500 R. P. M. so as to prevent the engine from stalling when the pump starts pumping fuel into the hose. The cargo tank valve is now opened and the hand nozzle at the end of the hose remains closed. The fluid pressure will build up to between 60 and 100 pounds per square inch. The operator now hauls the end of the hose to the tank to receive the gasoline or other fuel. Before the delivery nozzle is opened, the device is again actuated to move into its high speed position and the engine will now operate at 1000 R. P. M., to deliver the fuel rapidly to the tank when the operator opens the hand nozzle. The hand nozzle is of course kept open until the tank is filled or a desired quantity of fuel has been delivered. The device is now actuated to reduce the engine speed to the low speed of about 500 R. P. M., while the hose is wound back onto the reel. The internal cargo valve is now closed and the device is actuated to permit the engine to return to an idling speed of about 350 R. P. M. The power take-off is disconnected from the transmission and this completes the operation.

An object of our invention is to provide a variable two speed engine control that may be attached to an engine for operating it at two different predetermined speeds. The device can be operated by vacuum or by air pressure. The valve controlling the vacuum or air pressure may be electrically operated and this permits the valve control switch to be mounted on the truck in the vicinity of the other controls so that the operator can actuate the device without the necessity of moving away from the other controls.

A further object of our invention is to provide a device of the type described in which the two speeds of the engine, controlled by the device, can be adjusted so that the engine will operate at the desired low speed and at the desired high speed. The high speed position of the device may be attained without the necessity of moving it first to the low speed position.

A further object of our invention is to provide a device of the type described which is simple in construction, durable and efficient for the purpose intended, and which may be readily applied to the engine throttle.

Other objects and advantages will appear as the specification continues. The novel features will be set forth in the claims hereunto appended.

*Drawings*

For a better understanding of our invention, reference should be had to the accompanying drawings, forming a part of this application, in which:

Figure 4 is a schematic view showing the entire system, including the throttle valve and the vacuum connection to the intake manifold.

While we have shown only the preferred form of our invention, it should be understood that various changes, or modifications, may be made within the scope of the annexed claims without departing from the spirit thereof.

*Detailed description*

Figure 3:
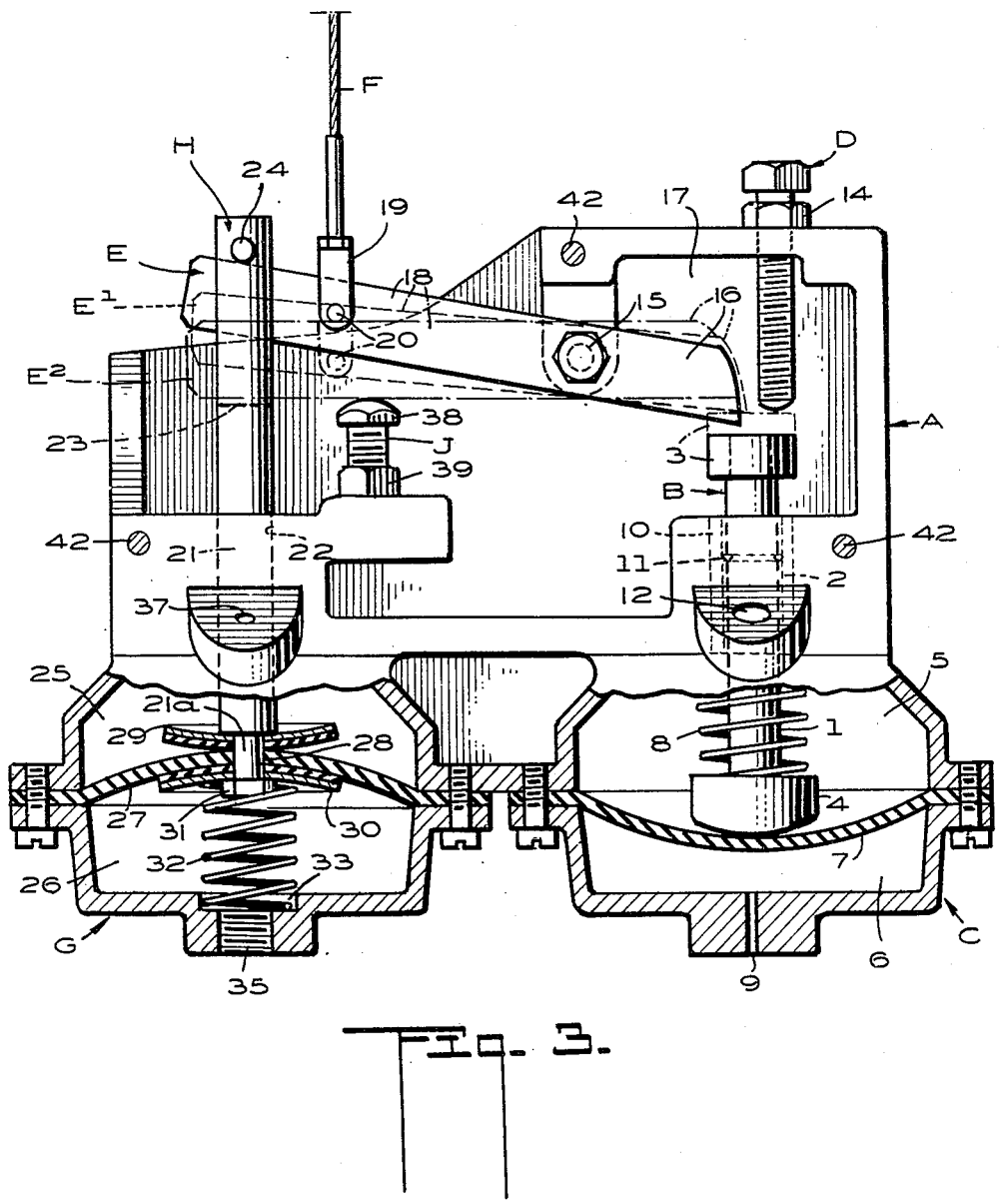
Figure 3 is a vertical section taken substantially along the line III—III of Figure 2.

The device comprises a casting, indicated generally at A in Figure 3. A spring-pressed plunger B has a shank 1 slidably received in a bore 2 of the casting A. A head 3 is mounted on the top of the shank 1, and a button 4 is mounted at the other end of the shank. The lower end of the shank 1 extends into an upper compartment 5 of a "low speed" vacuum control unit C. A lower compartment 6 of the same unit C is separated from the upper compartment by a diaphragm 7, and the button 4 is yieldingly held against the upper surface of the diaphragm by a coil spring 8 that is mounted on the shank portion 1 which is received in the upper compartment 5. The lower end of the coil spring 8 bears against the button 4 while the upper end bears against the inner surface of the upper compartment 5. The vacuum control unit C has a bleed opening 9 communicating with the lower compartment 6. Therefore the lower compartment 6 will have atmospheric pressure pressing against the undersurface of the diaphragm 7.

In order to prevent the vacuum compartment 5 from leaking, the bore 2 may be the interior of a tube 10, and the shank 1 may be provided with an O ring 11 that acts as a hermetic seal between the outer surface of the shank and the inner surface 2 of the tube 10. An opening 12 communicates with the interior of the upper compartment 5 and this opening is threaded for receiving a pipe 13, see Figure 1.

When a vacuum is applied to the upper compartment 5 in a manner hereafter described, the air pressure in the lower compartment 6 will force the diaphragm 7 upwardly, and will move the shank 1 and head 3 into the dot-dash line position shown in Figure 3. An adjusting screw D is threadedly carried by the casting A and limits the upward movement of the shank 1 and head 3. A lock nut 14 is threaded upon the adjusting screw D and prevents accidental movement of the screw after the latter has been moved into the desired position and the lock nut tightened against the casting.

A throttle control lever E is pivotally mounted on the casting at 15, and has its right end 16 received in a cavity 17 that also receives the upper end of the shank 1, the head 3, and the lower end of the adjusting screw D. The head 3 will first contact with the end 16 of the lever E and will swing the lever into the dotted line position E¹, at which time the head will come into contact with the lower end of the adjusting screw D and will be prevented from moving farther.

A cable F is connected to the left hand end 18 of the lever E by a clevis 19 which is pivoted to the lever at 20. The free end of the cable F is connected to the engine throttle valve 60, which is provided for the carbureter 61 (see Figure 4). Therefore when the plunger B is moved by the vacuum control unit C until the head 3 strikes the stop screw D, the lever E will be swung into the first position $E^1$, see Figure 3, and the cable F will advance the throttle to cause the engine to operate at slow speed, such as 500 R. P. M. Before the cable F advances the engine throttle, the engine was "idling" at a speed of about 350 R. P. M.

It is best to describe the means for swinging the lever E into its second or high speed position $E^2$, see Figure 3, before setting forth the electrical control elements. A "high speed" vacuum control unit G is placed to the left of the "low speed" vacuum control unit C in Figure 3. A spring-pressed plunger H has a shank 21 that is slidably received in a bore 22, provided in the casting A. The shank 21 is bifurcated at its top as at 23 for slidably receiving the end 18 of the lever E. A pin 24 is carried near the top of the shank 21 and projects across the slot 23 and constitutes the upper end of the slot. The left hand end 18 of the lever is free to move throughout the length of the slot 23. The purpose of the slot 23 is to permit free swinging of the lever E when it is actuated by the plunger B that swings the lever into low speed position.

The lower end of the shank 21 extends into an upper compartment 25 of the "high speed" vacuum control unit G. A lower compartment 26 of the same unit G is separated from the upper compartment 25 by a diaphragm 27. The shank 21 has a reduced portion 21a that extends through an opening 28 in the diaphragm 27. A Walsh plug 29 is mounted on the reduced shank portion 21a and bears against the shoulder formed at the juncture between the shank and its reduced portion. The convex under surface of the plug 29 contacts with the upper surface of the diaphragm 27. A second Walsh plug 30 is also mounted on the reduced shank 21a and has its upper convex surface contacting with the under concave surface of the diaphragm 27. A nut 31 is mounted on the threaded end of the reduced portion 21a and secures the Walsh plugs 29 and 30, and the diaphragm 27, to the shank 21. A coil spring 32 has its upper end bearing against the plug 30, and its lower end received in a seat 33 formed in the bottom wall of the lower compartment 26 of the "high speed" vacuum control unit G.

Figure 1:
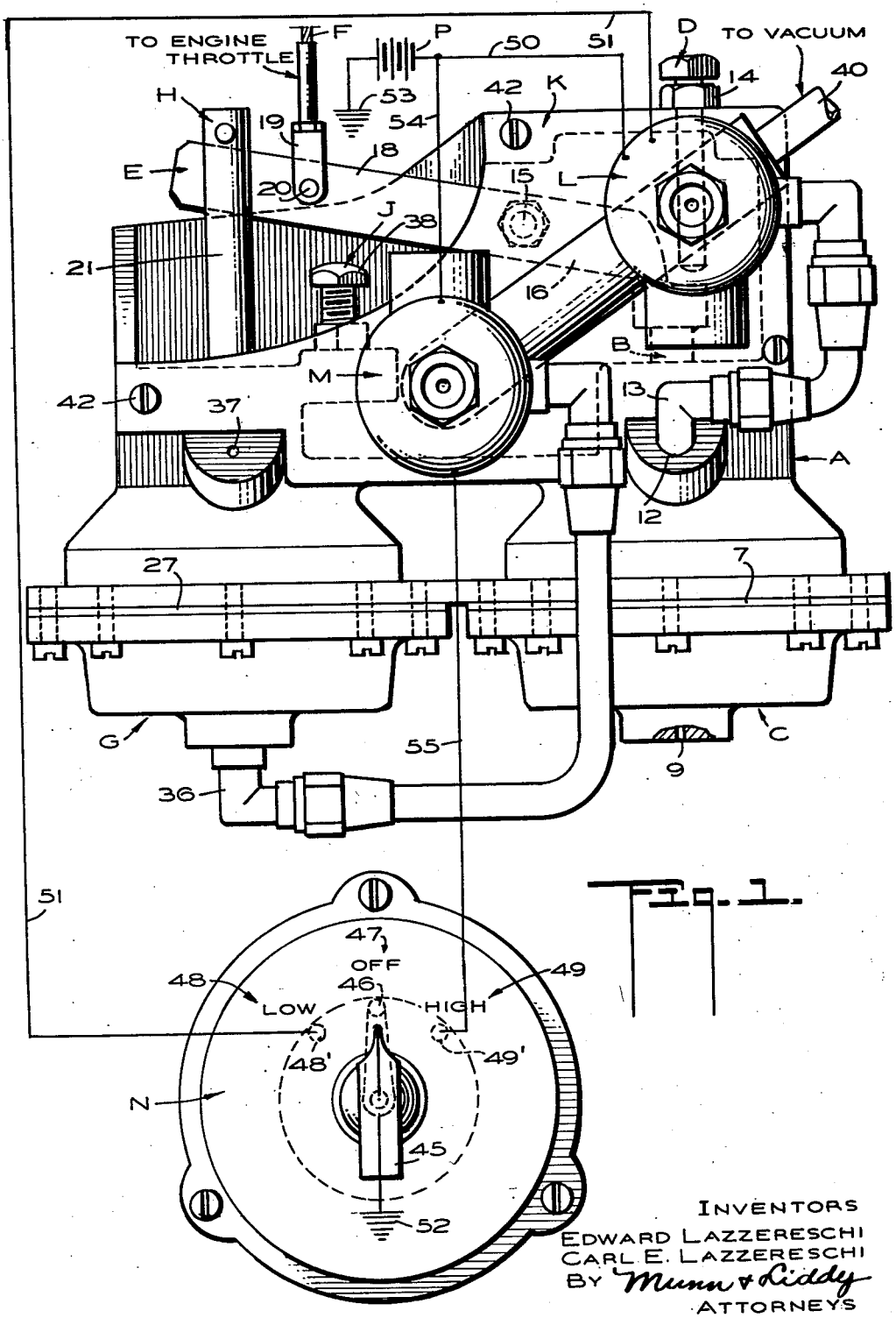
Figure 1 is a front elevation of the device and also illustrates the master switch for controlling the electric valves.

The lower compartment 26 of the unit G has a threaded opening 35, see Figure 3, for receiving a vacuum pipe 36, see Figure 1. A bleed opening 37 communicates with the upper compartment 25 and therefore atmospheric air pressure will press downwardly upon the diaphragm 27. When a vacuum is applied to the lower compartment 26 in a manner hereinafter described, the air pressure in the upper compartment 25 will force the diaphragm 27 downwardly, and will move the plunger H downwardly.

An adjusting screw J is threadedly carried by the casting A, and the head 38 of this screw lies in the path of the left hand end 18 of the lever E, as it moves downwardly, so as to limit the swing of the lever into its second position. A lock nut 39 is threaded upon the adjusting screw J and prevents accidental movement of the screw after the latter has been moved into the desired position and the lock nut tightened against the casting. As the plunger H moves downwardly, the pin 24 on the shank 21 will engage the end 18 of the lever E and swing it from the dotted line position $E^1$, shown in Figure 3, into the dot dash line position $E^2$, where the end 18 will contact with the head 38 of the adjusting screw J. The cable F will advance the engine throttle valve 60, so that the engine speed will be about 1000 R. P. M., or "high speed." The adjusting screw J can be regulated to cause the engine to operate at the desired speed.

Figure 2:
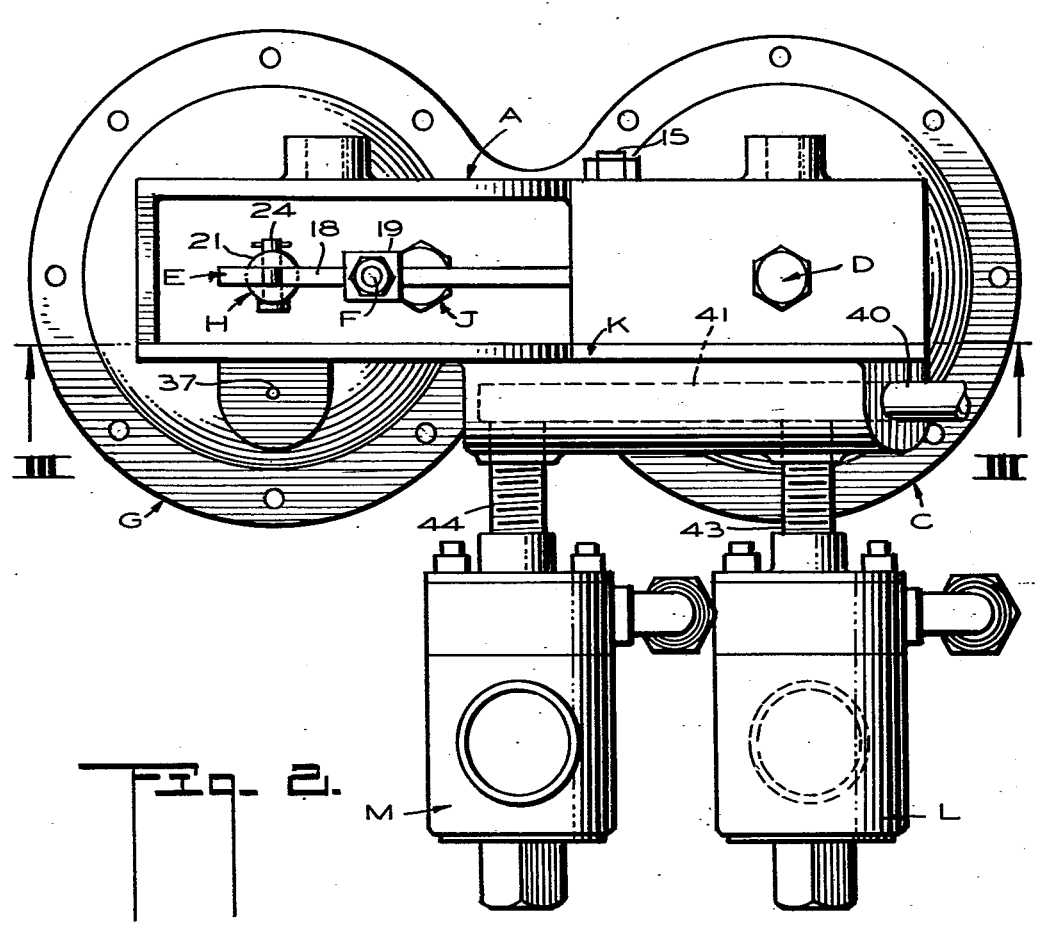
Figure 2 is a top plan view of the device.

It is best now to refer to Figures 1, 2 and 4 where the vacuum control is illustrated. A pipe 40 leads from the intake manifold 62 of an engine 63 to a passage 41 provided in a cover plate K. The cover plate K is secured to the casting A by screws 42 and encloses the cavity or compartment 17. Figure 2 shows two threaded pipes 43 and 44 communicating with the vacuum passage 41. An electrically controlled valve L is interposed between the pipe 43 and the pipe 13 that leads to the upper compartment 5 of the low speed vacuum control unit C. A second electrically controlled valve M is interposed between the pipe 44 and the pipe 36 that leads to the lower compartment 26 of the high speed control unit G.

A master control switch N is shown in Figure 1, and this switch may be mounted at any convenient place on the truck, not shown, preferably where all the other controls are placed. The switch has a handle 45 that will swing a contact arm 46 from the "Off" position 47 into either the "Low" position 48 or the "High" position 49. When the switch handle 45 is swung counterclockwise into the "Low" position, current will flow from a source of current P, through wire 50, electric valve L, wire 51 to the "Low" terminal 48', switch arm 46, and back to the current source P by means of the electrical grounds 52 and 53. The electric valve L will be opened and establish communication between the vacuum passage 41 and the compartment 5 through the pipe 13.

The plunger B of the low speed vacuum control unit C will be moved upwardly and will swing the lever E into the low speed position $E^1$. The cable F will advance the engine throttle valve 60, and the engine will increase from an idling speed of about 350 R. P. M., to a low speed of 500 R. P. M. The switch arm 45 on the master switch N will remain in the low speed position so long as the operator wants the engine to operate at this speed. The slot 23 in the shank 21 of the plunger H, is long enough to permit the left hand end 18 of the lever E to move therein as the lever is actuated by the plunger B of the low speed vacuum unit C.

Should now the operator desire to swing the lever E into the high speed position $E^2$, he swings the switch handle 45 on the master switch N, clockwise, until the switch arm 46 contacts a terminal 49'. An electric circuit is now closed from the curent source P through a wire 54 to the high speed electric valve M, and opens the valve. The other electric valve L, will close. The current flows from the electric valve M, through a wire 55 to the terminal 49' of the master switch N. The switch arm 46 is in contact with the terminal 49' and therefore the circuit will be completed through the switch arm 46, the two electrical grounds 52 and 53, and back to the source of current P.

The opening of the electric valve M will place the vacuum passage 41 in Figure 2, in communication with the lower chamber 26 in the high speed vacuum unit G. The plunger H will swing the lever E into its high speed position $E^2$ and the cable F will move the engine throttle valve 60 into a position for accelerating the engine up to a speed of 1000 R. P. M. or any other predetermined desired speed. The engine will continue to operate at this high speed as long as the switch arm 46 contacts the terminal 49'.

The operator can reduce the engine speed back to idling at 350 R. P. M., by merely swinging the switch arm 45 back to "Off" position 47 on the master switch N. The current will be cut off to both electric valves L and M, and the valves will close.

It is possible to have the device operate under air pressure rather than vacuum by making a simple change. Air under pressure is delivered by the pipe 40 to the passage 41 rather than a vacuum. The pipe 13 will lead from the valve L to the lower compartment 6 of the slow speed unit C, rather than to the upper compartment 5. The upper compartment 5 is in communication with the atmosphere. Also the pipe 36 could lead from the electric valve M, to the upper compartment 25 of the high speed unit G, rather than to the lower compartment 26. The lower compartment 26 would be in communication with the atmosphere. The rest of the operation of the device would be identical to the operation when vacuum is used.

The device can be used wherever two engine speeds are desired in addition to an idling speed. The device can be readily installed without any alterations being necessary in the engine. The cable F can be connected to the engine throttle so as not to interfere with the usual foot control of the throttle.

We claim:

1. In combination: a pivoted lever; a connection leading from the lever to the throttle of an engine for moving the throttle to advance the engine speed from an idling speed to low speed; a plunger contactible with one end of the lever; means for moving the plunger for swinging the lever for causing the latter to move the connection and advance the throttle to low speed position; a second plunger contactible with the other end of the lever; and means for moving the second plunger for swinging the lever still further in the same direction for causing the connection to advance the throttle to high speed position.

2. In combination: a pivoted lever; a connection leading from the lever to the throttle of an engine for moving the throttle to advance the engine speed from an idling speed to low speed; a plunger contactible with one end of the lever; yielding means for moving the plunger for swinging the lever for causing the latter to move the connection and advance the throttle to low speed position; an adjustable stop placed in the path of the moving plunger for limiting the swinging of the lever into low speed position; a second plunger having a slot for slidably receiving the other end of the lever and permitting the lever to swing from idling into low speed position without affecting the second plunger; yielding means for moving the second plunger in a direction opposite to the movement of the first plunger; the second plunger having a pin for swinging the lever still further in the same direction for causing the lever connection to advance the throttle to high speed position; and a second adjustable stop placed in the path of the swinging lever for stopping the lever at the desired high speed position.

3. The combination as set forth in claim 2 and in which the yielding means for moving the first-named plunger, consists of a vacuum-controlled unit; an electric valve for placing the vacuum unit in communication with a source of vacuum; whereby the first plunger will swing the lever into low speed position; the yielding means for moving the second-named plunger consisting of a second vacuum-controlled unit; a second electric valve for placing the second vacuum unit in communication with the vacuum source; whereby the second plunger will swing the lever into high speed position; and a switch for connecting either electric valve to a source of current for causing the lever to swing either into a low speed or high speed position.

References Cited in the file of this patent

UNITED STATES PATENTS

| | | |
|---|---|---|
| 2,622,576 | Rickenbach | Dec. 23, 1952 |
| 2,638,082 | Dillard | May 12, 1953 |
| 2,651,263 | Mathews | Sept. 8, 1953 |
| 2,695,629 | Ribley | Nov. 30, 1954 |